United States Patent
Kumar et al.

(10) Patent No.: US 12,022,437 B2
(45) Date of Patent: Jun. 25, 2024

(54) DIRECT CURRENT LOCATION SHARING BETWEEN UNICAST USER EQUIPMENTS IN SIDELINK

(71) Applicant: QUALCOMM Incorporated, San Diego, CA (US)

(72) Inventors: Satish Kumar, Hyderabad (IN); Sarath Pinayour Chandrasekaran, Hyderabad (IN); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 17/384,401

(22) Filed: Jul. 23, 2021

(65) Prior Publication Data

US 2023/0034338 A1    Feb. 2, 2023

(51) Int. Cl.
| | |
|---|---|
| *H04W 72/00* | (2023.01) |
| *H04W 8/24* | (2009.01) |
| *H04W 72/02* | (2009.01) |
| *H04W 72/0453* | (2023.01) |
| *H04W 72/20* | (2023.01) |

(52) U.S. Cl.
CPC ............. *H04W 72/02* (2013.01); *H04W 8/24* (2013.01); *H04W 72/0453* (2013.01); *H04W 72/20* (2023.01)

(58) Field of Classification Search
None
See application file for complete search history.

(56) References Cited

U.S. PATENT DOCUMENTS

| | | |
|---|---|---|
| 9,893,855 B2 | 2/2018 | Kim et al. |
| 2002/0042256 A1 | 4/2002 | Baldwin et al. |
| 2017/0245278 A1* | 8/2017 | Xue ................. H04W 72/0453 |

(Continued)

FOREIGN PATENT DOCUMENTS

| | | | | |
|---|---|---|---|---|
| WO | WO2018082469 | * | 1/2018 | ............... H04L 5/00 |
| WO | 2021121233 A1 | | 6/2021 | |

OTHER PUBLICATIONS

Apple Inc: "Dynamic Reporting of Tx DC Location for UL CA", 3GPP TSG-RAN WG2 Meeting #112e, R2-2009518, 3rd Generation Partnership Project, Mobile Competence Centre, 650, Route Des Lucioles, F-06921 Sophia-Antipolis Cedex, France, vol. RAN WG2, No. Online, Nov. 2, 2020-Nov. 13, 2020, Oct. 23, 2020, XP051942471, 19 Pages, p. 2.

(Continued)

*Primary Examiner* — Abdelillah Elmejjarmi
(74) *Attorney, Agent, or Firm* — Procopio, Cory, Hargreaves & Savitch LLP

(57) ABSTRACT

The apparatus may be a UE. The UE may be configured to receive, from a second UE, an indication of a first DC location corresponding to a first subcarrier of multiple subcarriers. The UE may further be configured to decode at least one transmission from the second UE based on the received indication of the first DC location corresponding to the first subcarrier. The UE may also be configured to receive a request for a second DC location and to transmit, to the second UE, an indication of a second DC location corresponding to a second subcarrier of the multiple subcarriers. The UE may, in some aspects, further be configured to receive, from a base station, signaling relating to a transmission of a DC location between sidelink UEs.

27 Claims, 11 Drawing Sheets

(56) References Cited

U.S. PATENT DOCUMENTS

| | | | |
|---|---|---|---|
| 2018/0167946 A1 | 6/2018 | Si et al. | |
| 2019/0313394 A1* | 10/2019 | Kubota | H04L 5/0092 |
| 2020/0014508 A1* | 1/2020 | Guo | H04L 5/0053 |
| 2021/0050954 A1* | 2/2021 | Ryu | H04W 72/02 |
| 2022/0132460 A1* | 4/2022 | Shimoda | G01S 5/021 |
| 2022/0263628 A1* | 8/2022 | Liu | H04L 5/0053 |
| 2023/0217287 A1* | 7/2023 | Son | H04W 24/10 370/329 |

OTHER PUBLICATIONS

CATT: "Discussion on DC Location Reporting for Intra-Band UL CA", 3GPP TSG-RAN WG2 Meeting #112 electronic, R2-2009371, 3rd Generation Partnership Project, Mobile Competence Centre, 650, Route Des Lucioles, F-06921 Sophia-Antipolis Cedex, France, vol. RAN WG2, No. Online, electronic, Nov. 1, 2020, Oct. 23, 2020, XP051942332, 10 Pages, p. 1-p. 4.

International Search Report and Written Opinion—PCT/US2022/038052—ISA/EPO—dated Nov. 9, 2022.

\* cited by examiner

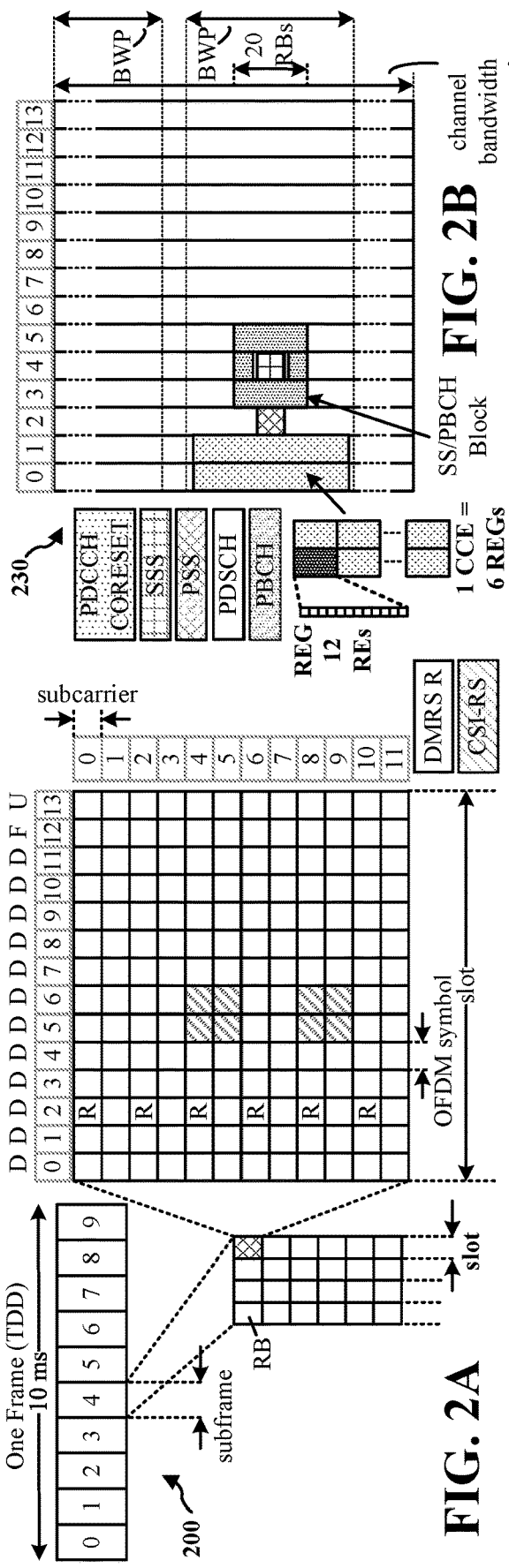
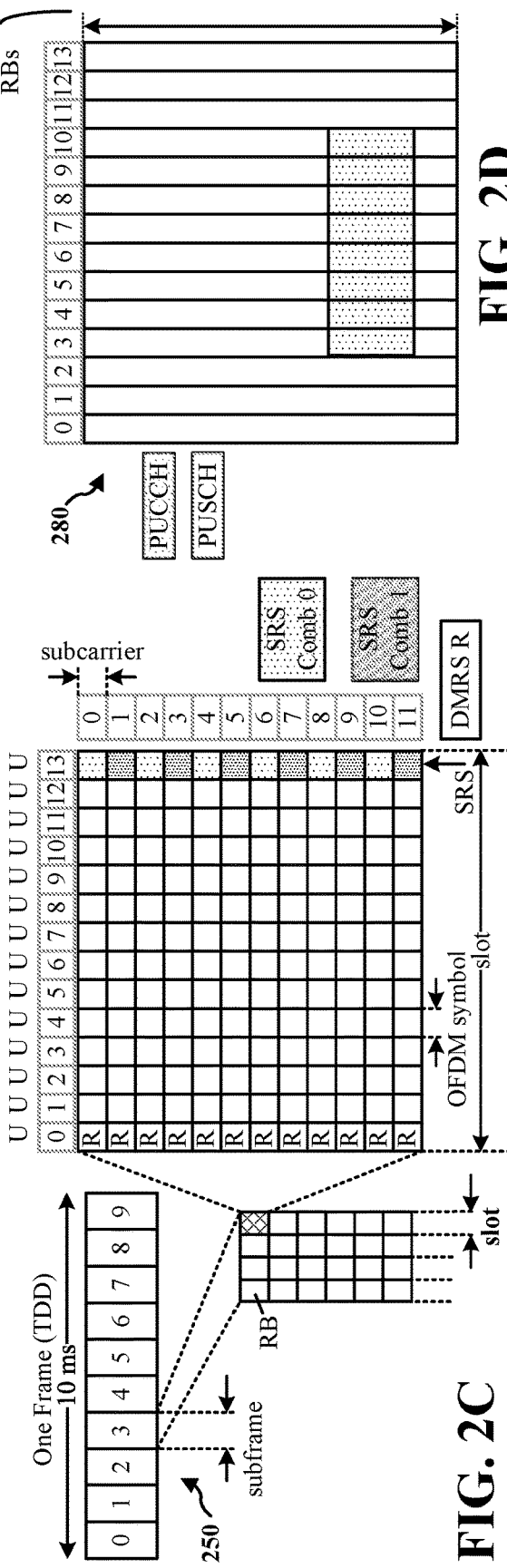
FIG. 2A
FIG. 2B
FIG. 2C
FIG. 2D

DIRECT CURRENT LOCATION SHARING BETWEEN UNICAST USER EQUIPMENTS IN SIDELINK

TECHNICAL FIELD

The present disclosure relates generally to communication systems, and more particularly, to sharing a direct current (DC) location indication between user equipments (UEs) in sidelink (SL) communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects of wireless communication, e.g., 5G NR, a DC location may be indicated by a base station to a set of UEs. The DC location indication may indicate that the DC location associated with the UE is determined by a UE (e.g., is based on the UE implementation or is otherwise UE-dependent). The DC location (e.g., subcarrier) may contribute to interference and/or noise and may cause performance degradation. A receiver (e.g., a receiving UE) may apply DC rejection filtering or puncturing to mitigate the degradation (e.g., may disregard the tone affected by DC) based on a received DC location indication. It may thus be beneficial for a transmitting UE communicating with a receiving UE via SL to indicate a DC location (e.g., subcarrier) associated with the transmitting and/or receiving UE when the base station indicates that the DC location is UE-dependent to allow the receiving UE to filter the DC tone at the indicated DC location.

In an aspect of the disclosure, a method, a computer-readable medium, and an apparatus are provided. The apparatus may be a device at a first UE. The device may be a processor and/or modem at a UE or the UE itself. The first UE may be configured to receive, from a second UE, an indication of a first DC location corresponding to a first subcarrier of multiple subcarriers. The first UE may further be configured to decode at least one transmission from the second UE based on the received indication of the first DC location corresponding to the first subcarrier. The first UE may also be configured to transmit, to the second UE, an indication of a second DC location corresponding to a second subcarrier of the multiple subcarriers. The first UE may further be configured to receive a request for a second DC location, where the indication of the second DC location is transmitted based on the received request. The first UE may also be configured to detect the second DC location based on an amplitude associated with the second DC location that is above a threshold amplitude. The first UE may, in some aspects, be configured to receive, from a base station, signaling relating to a transmission of a DC location between SL UEs.

In an aspect of the disclosure, a method, a computer-readable medium, and an apparatus are provided. The apparatus may be a device at a second UE. The device may be a processor and/or modem at a UE or the UE itself. The second UE may be configured to receive an indication for the second UE to indicate a DC location corresponding to a subcarrier of multiple subcarriers. The second UE may also be configured to transmit, to a first UE, an indication of a first DC location corresponding to a first subcarrier of multiple subcarriers. The second UE may further be configured to transmit, to the first UE, at least one transmission associated with the indication of the first DC location corresponding to the first subcarrier. The second UE may also be configured to transmit, to the first UE, at least one sidelink control information (SCI) transmission indicating the first DC location, the SCI being received in one of a physical sidelink shared channel (PSSCH) or a physical sidelink control channel (PSCCH). The second UE, in some aspects, may be configured to transmit, to the first UE, at least one transmission before the MAC-CE is transmitted, the at least one transmission being transmitted via a physical sidelink broadcast channel (PSBCH). In some aspects, the second UE may be configured to detect the first DC location based on an amplitude associated with the first DC location that is above a threshold amplitude. The second UE may further be configured to encode the at least one transmission based on the indication of the first DC location, where the at least one transmission is encoded before being transmitted.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
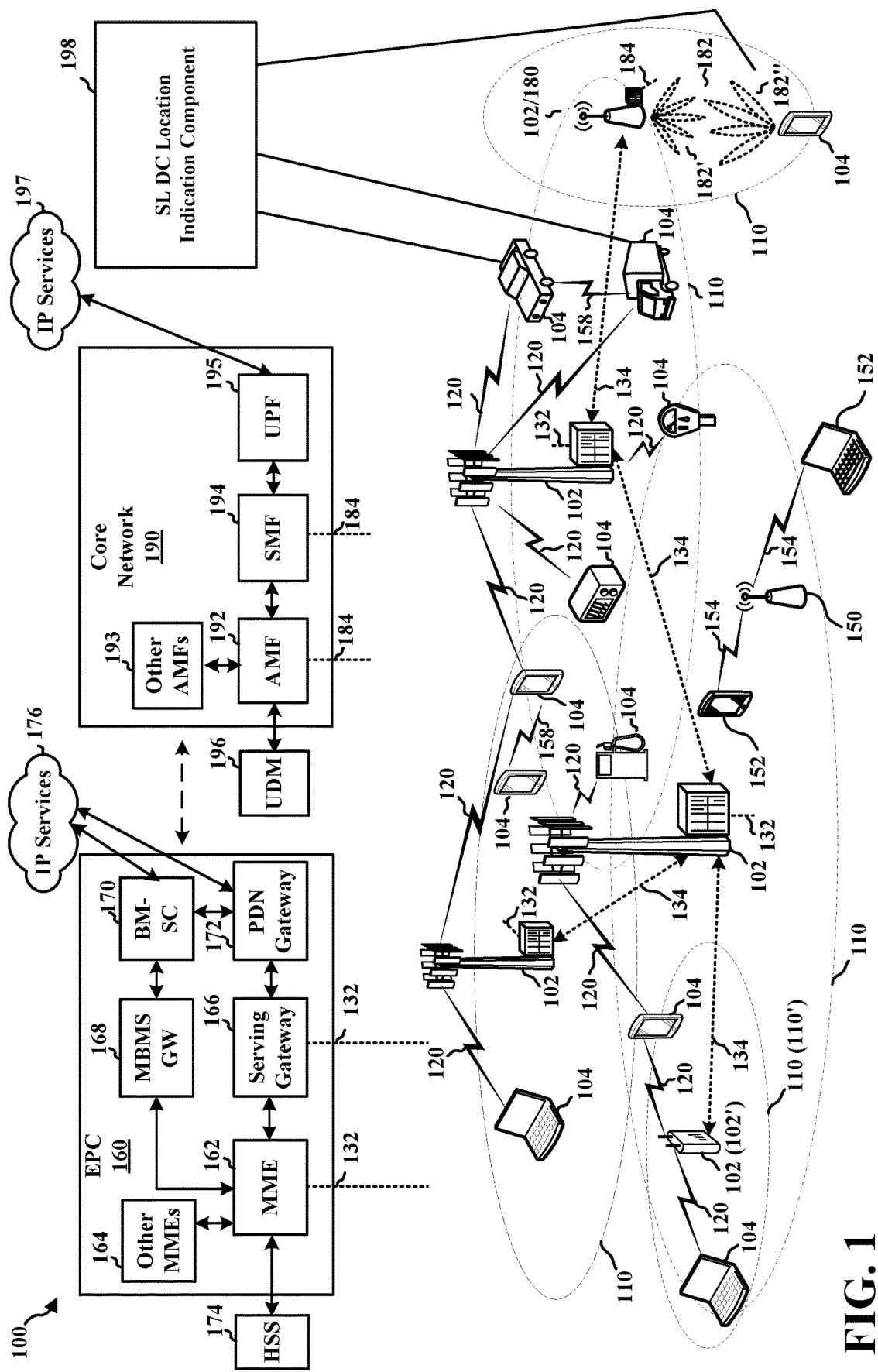
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include multiple antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a SL DC location indication component 198 that may be configured to receive, from a second UE, an indication of a first DC location corresponding to a first subcarrier of multiple subcarriers. The SL DC location indication component 198 may further be configured to decode at least one transmission from the second UE based on the received indication of the first DC location corresponding to the first subcarrier. The SL DC location indication component 198 may also be configured to transmit, to the second UE, an indication of a second DC location corresponding to a second subcarrier of the multiple subcarriers. The SL DC location indication component 198 may further be configured to receive a request for a second DC location, where the indication of the second DC location is transmitted based on the received request. The SL DC location indication component 198 may also be configured to detect the second DC location based on an amplitude associated with the second DC location that is above a threshold amplitude. The SL DC location indication component 198 may, in some aspects, be configured to receive, from a base station, signaling relating to a transmission of a DC location between SL UEs.

The SL DC location indication component 198 may, in some aspects, be configured to receive an indication for to indicate a DC location corresponding to a subcarrier of multiple subcarriers. The SL DC location indication component 198 may also be configured to transmit, to a first UE, an indication of a first DC location corresponding to a first subcarrier of multiple subcarriers. The SL DC location indication component 198 may further be configured to transmit, to the first UE, at least one transmission associated with the indication of the first DC location corresponding to the first subcarrier. The SL DC location indication component 198 may also be configured to transmit, to the first UE, at least one SCI transmission indicating the first DC location (e.g., indicating a bitmask associated with a MAC-CE), the SCI being received in one of a PSSCH or a PSCCH. The second UE, in some aspects, may be configured to transmit, to the first UE, at least one transmission before the MAC-CE is transmitted, the at least one transmission being transmitted via a PSBCH. In some aspects, the SL DC location indication component 198 may be configured to detect the first DC location based on an amplitude associated with the first DC location that is above a threshold amplitude. The SL DC location indication component 198 may further be configured to encode the at least one transmission based on the indication of the first DC location, where the at least one transmission is encoded before being transmitted.

The SL DC location indication component 198 may, in some aspects, be configured to receive, from a base station, signaling relating to a transmission of a DC location between SL UEs. The SL DC location indication component 198 may also be configured to transmit, to the second UE, an indication of a second DC location corresponding to a second subcarrier of the multiple subcarriers. The SL DC location indication component 198 may further be configured to detect the second DC location based on an amplitude associated with the second DC location that is above a threshold amplitude. The SL DC location indication component 198 may further be configured to receive a request for a DC location corresponding to a subcarrier of multiple subcarriers. The SL DC location indication component 198 may further be configured to transmit at least one transmission based on the indication of the DC location corresponding to the subcarrier. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
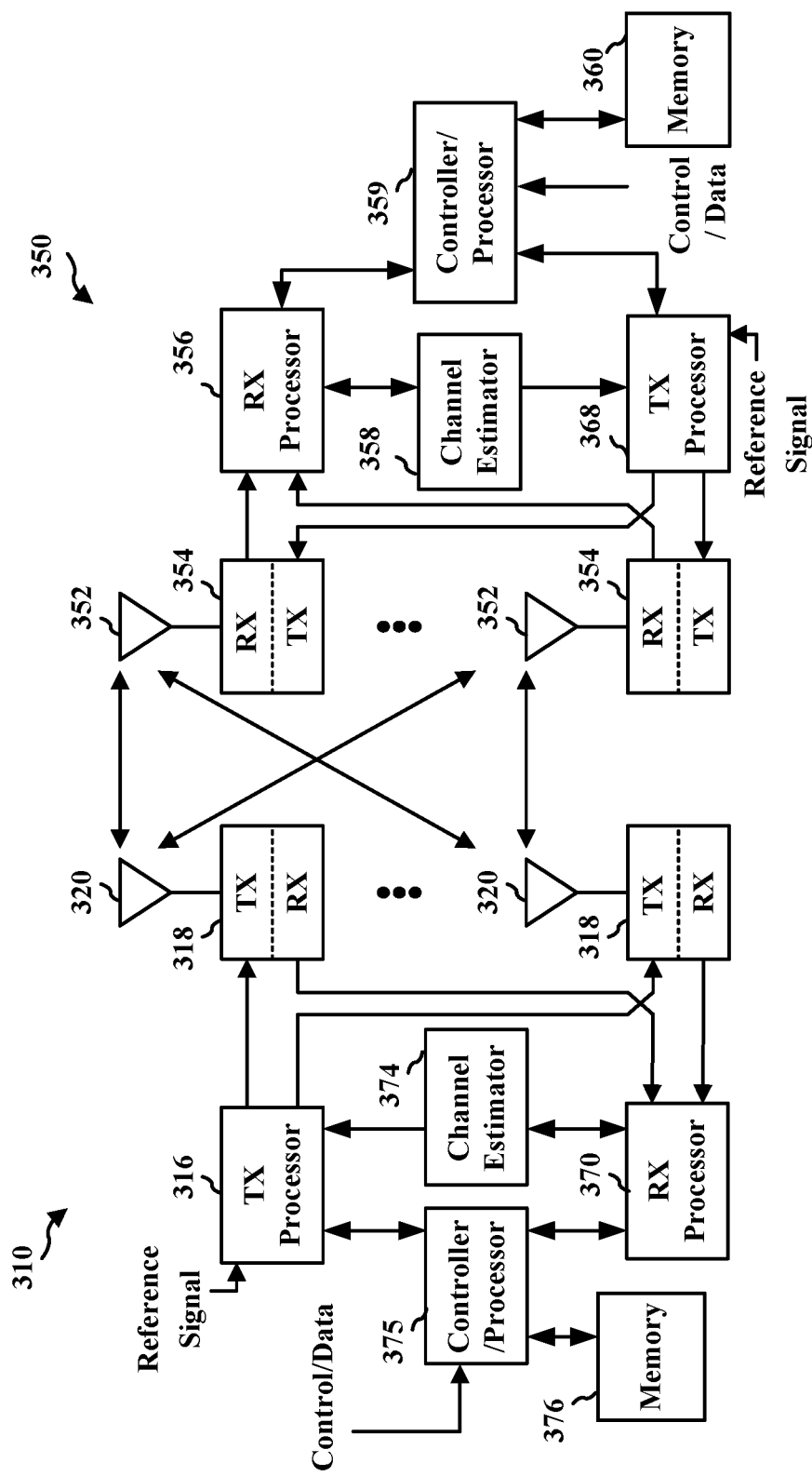
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

In some aspects of wireless communication, e.g., 5G NR, a DC location may be indicated by a base station to a set of UEs. The DC location indication may indicate that the DC location associated with the UE is determined by a UE (e.g., is based on the UE implementation or is otherwise UE-dependent). The DC location (e.g., subcarrier) may contribute to interference and/or noise and may cause performance degradation. A receiver (e.g., a receiving UE) may apply DC rejection filtering or puncturing to mitigate the degradation (e.g., may disregard the tone affected by DC) based on a received DC location indication. It may thus be beneficial for a transmitting UE communicating with a receiving UE via SL to indicate a DC location (e.g., subcarrier) associated with the UE when the base station indicates that the DC location is UE-dependent to allow the receiving UE to filter the DC tone at the indicated DC location.

Figure 4:
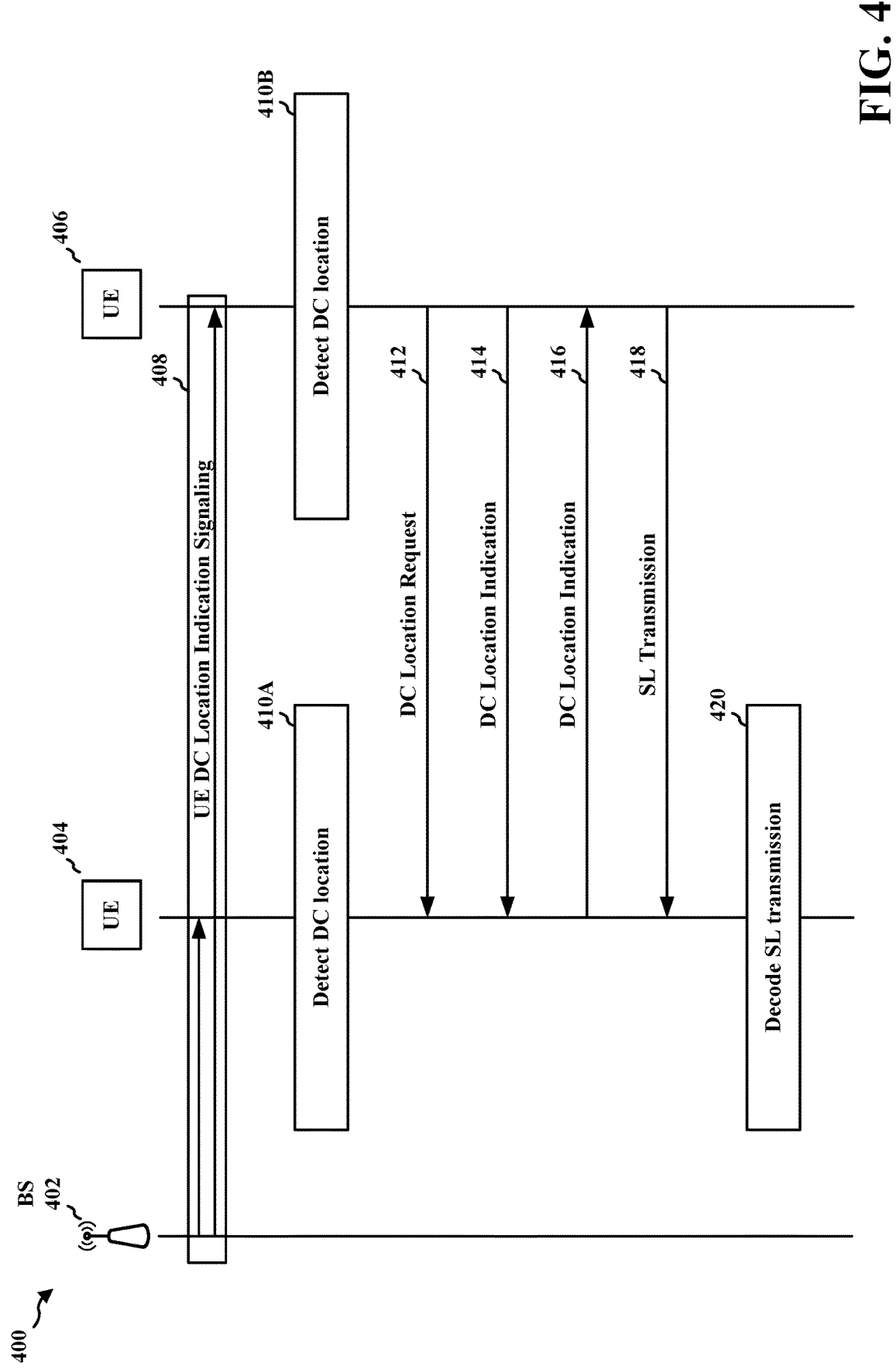
FIG. 4 is a call flow diagram illustrating a set of UEs communicating DC location indication.

FIG. 4 is a call flow diagram 400 illustrating a set of UEs (e.g., UEs 404 and 406) communicating DC location indication. A base station 402 may transmit, and UEs 404 and 406 may receive, an indication 408 relating to a transmission of a DC location indication between UEs for SL communication. Based on the indication 408, the UE 404 and/or the UE 406 may detect 410A and/or 410B a DC location (e.g., the location in frequency-space of a DC tone). Detecting 410A and/or 410B the DC location, in some aspects, may be based on an amplitude associated with the DC location that is above a threshold amplitude. In some aspects, the DC frequency location may be dependent on the receiving and/or transmitting UE's implementation. For example, in an NR network, a base station may configure a UE for SL communications in various BWPs within various component carriers (CCs). Different UEs may have different RF receiver implementations. For example, some UEs may use a single RF and/or baseband chain for all CCs and/or all BWPs, while other UEs may use different RF and/or baseband chains for different CCs and/or different BWPs. Thus, the DC tone location may vary among different UEs, as well as within the same UE depending on the RF frontend configuration in use. Accordingly, the UEs 404 and/or 406 may detect 410A and/or 410B a DC location to identify reference signal configurations according to DC tone locations of the UEs 404 and/or 406.

In some aspects, the UE 406 may transmit a DC location request 412 to the UE 404. The DC location request 412 may be included in a SL control channel (SCCH) message. The DC location request 412 (e.g., the SCCH message) may be one of an RRC reconfiguration message, or a UE-capability information enquiry in some aspects. The DC location request 412 may be based on the UE DC location indication signaling 408 relating to the transmission of the DC location indication between UEs for SL communication. For example, the signaling may indicate that the DC location is UE-dependent and a DC location request or DC location indication may be transmitted by a UE receiving the signaling.

Figure 5:
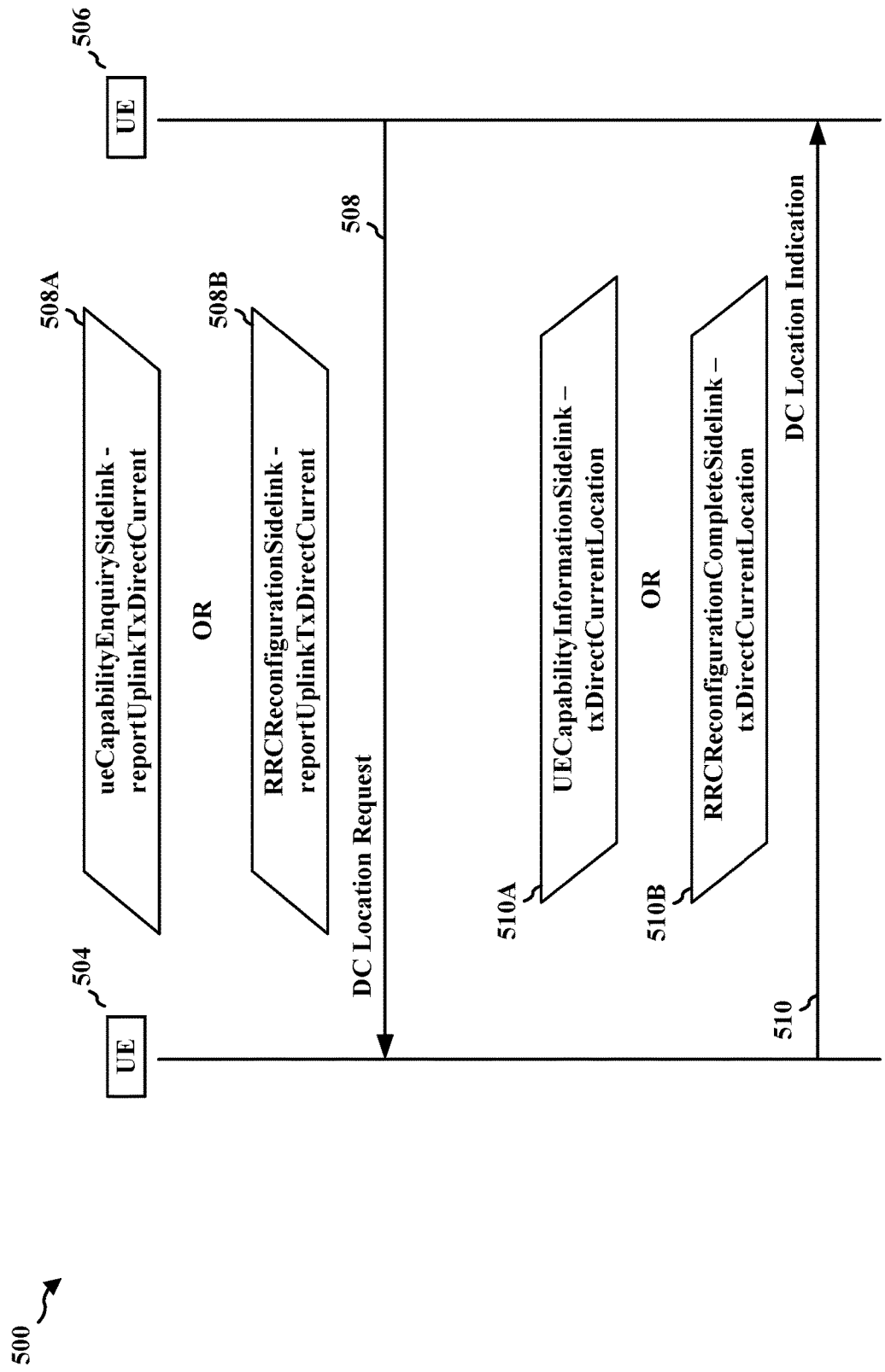
FIG. 5 is a call flow diagram illustrating a DC location response transmitted in response to a DC location request.

Based on DC location request 412, the UE 404 may transmit a DC location indication 414. The DC location indication 414 may be transmitted in one of a UE-capability message, an RRC reconfiguration message, a PSBCH, or a MIB. FIG. 5 is a call flow diagram 500 illustrating a DC location indication 510 transmitted in response to a DC location request 508. Diagram 500 illustrates a DC location request 508 transmitted from the UE 504 and received by the UE 506. DC location request 508 may include a ueCapabilityEnquirySidelink message 508A (e.g., including a report UplinkTxDirectCurrent filed or message) or an RRCReconfiguration-CompleteSidelink message 508B (e.g., including a report UplinkTxDirectCurrent field or message). As illustrated in diagram 500, a DC location indication 510 may include a UECapabilityInformationSidelink message 510A (e.g., including a txDirectCurrentLocation field or message) in response to ueCapabilityEnquirySidelink message 508A or an RRCReconfiguration-CompleteSidelink message 510B (e.g., including a txDirectCurrentLocation field or message). In some aspects, one, or both, of UE 504 and UE 506 may receive a DC location request (e.g., DC location request 508) and transmit a DC location indication (e.g., DC location indication 510).

Returning to the discussion of FIG. 4, after receiving DC location indication 414, the UE 404 may transmit, and UE 406 may receive, DC location indication 416 indicating a DC location associated with UE 404. The DC location indication 416 may be transmitted based on the DC location request 412. The DC location indication 416 may include an RRCReconfigurationCompleteSidelink message (e.g., including a txDirectCurrentLocation field or message) as described in further detail in relation to FIG. 6 below. The UE 406 may transmit, and the UE 404 may receive, an SL transmission 418. The UE 404 may, based on the DC location indication 414, decode 420 the filtered SL transmission. In some aspects, decoding the filtered SL transmission includes at least one of (1) filtering the one or more DC locations indicated in DC location indication 414, (2) puncturing the one or more DC locations indicated in DC location indication 414, (3) compensating for a DC tone at the one or more DC locations indicated in DC location indication 414, and/or (4) may ignore (e.g., not use) data from the one or more DC locations indicated in DC location indication 414. The UE 406 may puncture the DC location indicated in one or more of the DC location indications 414 and/or 416 (e.g., may not transmit data via DC subcarrier indicated in the DC location indication 414 and/or 416).

Figure 6:
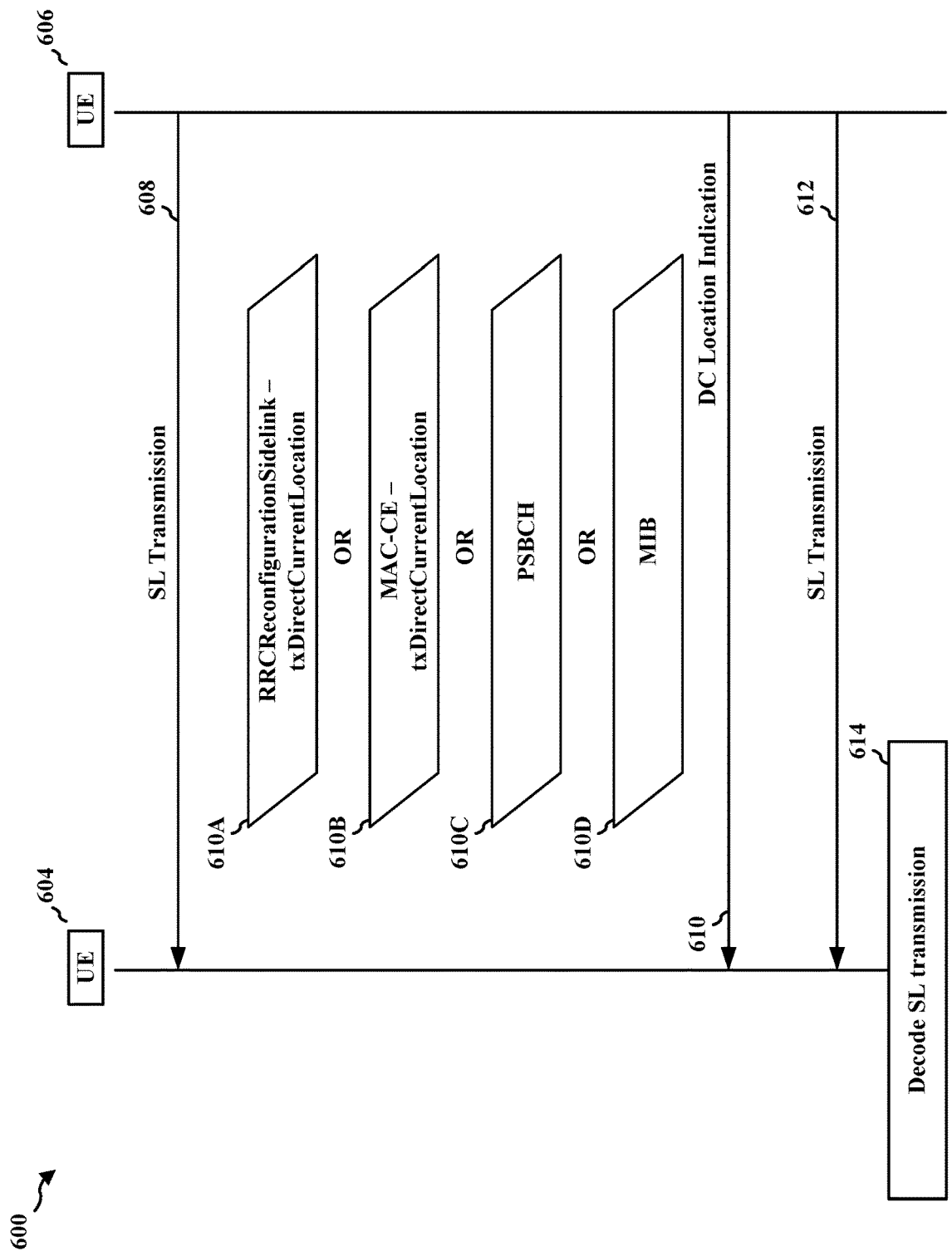
FIG. 6 is a call flow diagram illustrating a DC location indication that is transmitted independently of a DC location request.

FIG. 6 is a call flow diagram 600 illustrating a DC location indication 610 that is transmitted independently of a DC location request. Diagram 600 further illustrates that DC location indication 610 may be transmitted after at least one SL transmission 608 has been transmitted by UE 606 and received by UE 604 (e.g., after an SL communication has been established). In some aspects, the SL transmission 608 may include a SCI transmission including the DC location indication 610 (e.g., by indicating a bitmask associated with a MAC-CE including a DC location indication). The bitmask may, in some aspects, indicate a location of the MAC-CE including the DC location indication. The SCI directly or indirectly indicating the DC location may be received in one of a PSSCH or a PSCCH.

Diagram 600 illustrates that UE 606 may transmit, and UE 604 may receive, SL transmission 608 and may subsequently transmit a DC location indication 610. The DC location indication 610 may be included in an RRCReconfigurationSidelink message 610A (e.g., including a txDirectCurrentLocation field or message), a medium access control (MAC) control element (MAC-CE) 610B (e.g., including a txDirectCurrentLocation field or message), a PSBCH 610C (e.g., a PSBCH payload), or an MIB 610D (e.g., an MIB payload). The UE 606 may transmit a subsequent SL transmission 612 that is received by UE 604. The UE 604 may decode 614 the SL transmission 612 based on the received DC location indication 610. As described above, decoding the SL transmission 612 may include at least one of filtering, puncturing, compensating, or excluding the DC tone at the indicated DC location.

Figure 7:
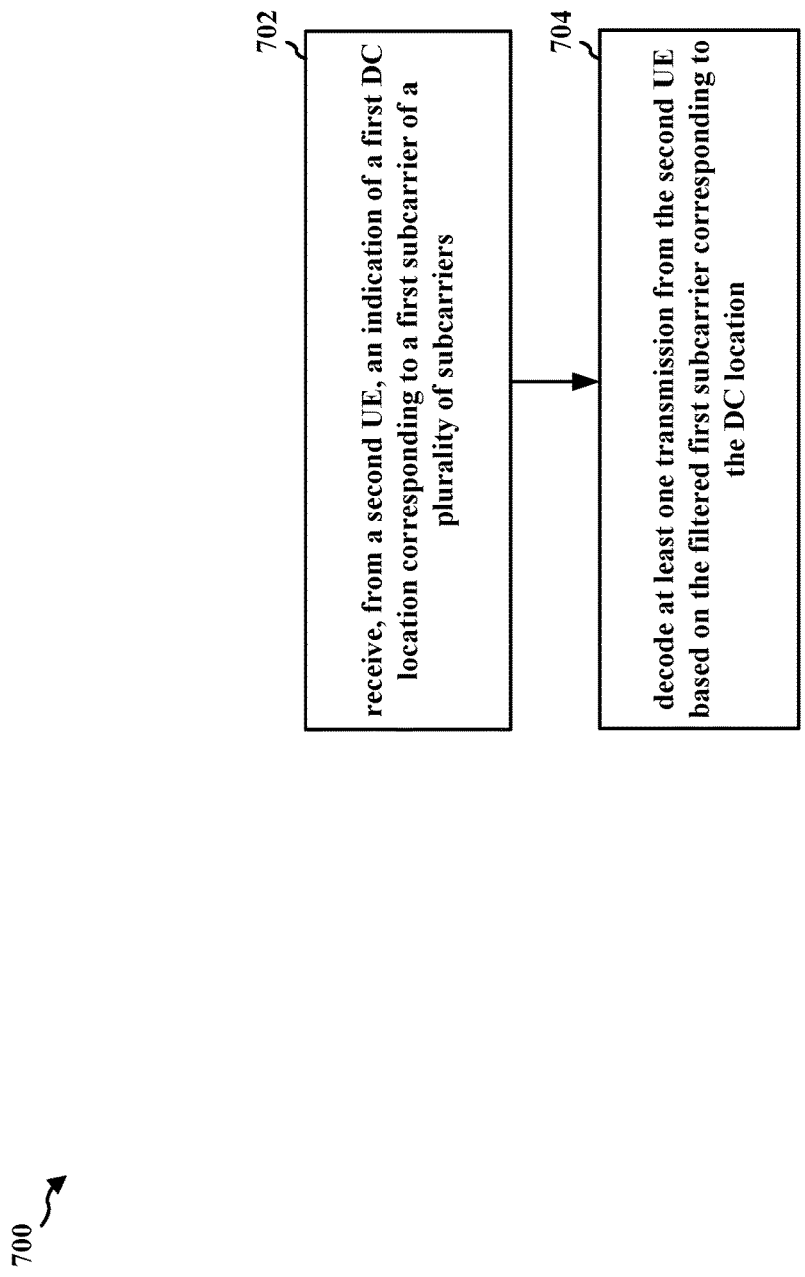
FIG. 7 is a flowchart of a method of wireless communication.

FIG. 7 is a flowchart 700 of a method of wireless communication. The method may be performed by a UE (e.g., the UE 104, 404, 504, or 604; the apparatus 1102). At 702, the UE may receive, from a second UE, an indication of a first DC location corresponding to a first subcarrier of multiple subcarriers. The DC location indication may be transmitted in one of a UE-capability message, an RRC reconfiguration message, a MAC-CE, a PSBCH, or a MIB. In some aspects, the DC location indication may be received based on a DC location request transmitted by the UE. The DC location indication, in some aspects, may be received based on a signal from a base station relating to a transmission of a DC location indication between UEs for SL communication.

In some aspects, a DC frequency location may be dependent on the receiving and/or transmitting UE's implementation. For example, in an NR network, a base station may configure a UE for SL communications in various BWPs within various CCs. Different UEs may have different RF receiver implementations. For example, some UEs may use a single RF and/or baseband chain for all CCs and/or all BWPs, while other UEs may use different RF and/or baseband chains for different CCs and/or different BWPs. Thus, the DC tone location may vary among different UEs, as well as within the same UE depending on the RF frontend configuration in use. For example, referring to FIGS. 4-6, a UE 404, 504, or 604 may receive a DC location indication 414, 510, or 610. For example, 702 may be performed by a DC location indication reception component 1140.

At 704, the UE may decode at least one transmission from the second UE based on the received indication of the first DC location corresponding to the first subcarrier of the multiple subcarriers. For example, referring to FIG. 4, the UE 404 may decode 422 the SL transmission 418. For example, 704 may be performed by a DC location compensation component 1144.

In some aspects, decoding, at 704, the at least one transmission from the second UE may include filtering, based on the received indication, the first subcarrier corresponding to the DC location. Decoding, at 704, the at least one transmission from the second UE may include, in some aspects, excluding the DC location (e.g., ignoring or not using) the transmission at the DC location subcarrier. In some aspects, decoding, at 704, the at least one transmission from the second UE may include compensating for the corresponding DC tone (e.g., the tone at an indicated DC location). Decoding, at 704, the at least one transmission from the second UE may include, in some aspects, puncturing a transmission at the indicated DC location.

Figure 8:
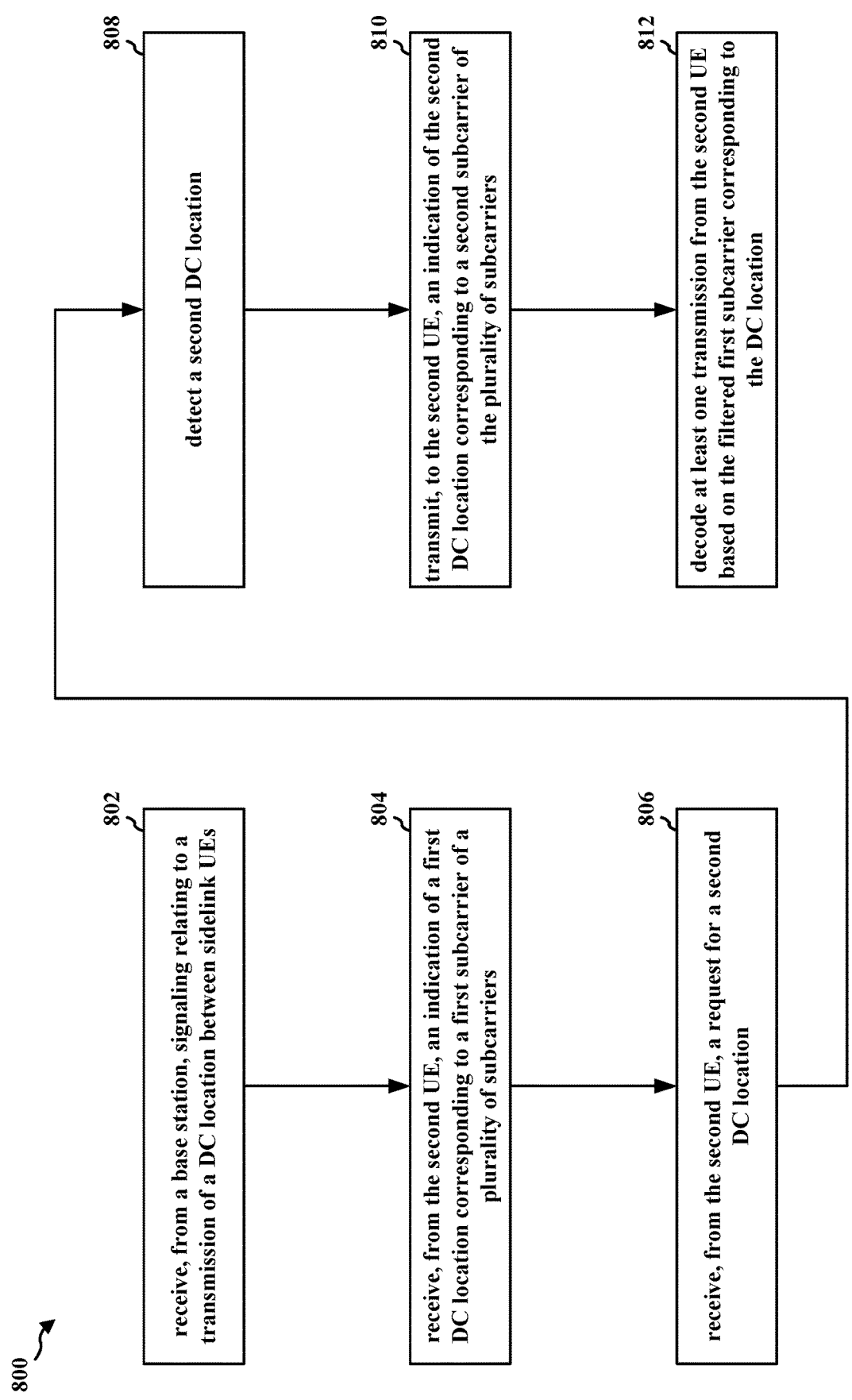
FIG. 8 is a flowchart of a method of wireless communication.

FIG. 8 is a flowchart 800 of a method of wireless communication. The method may be performed by a UE (e.g., the UE 104 or 404; the apparatus 1102). At 802, the UE may receive, from a base station, signaling relating to a transmission of a DC location between SL UEs. In some aspects, the signal may be included in a slTxDirectCurrentLocation or sl-TxDirectCurrentLocation field in a configuration message associated with a SL frequency (e.g., in a SL-FreqConfigCommon information element (IE)) or a SL BWP (e.g., an SL-BWP-Config IE), respectively. The signal may be an indication that the DC location is UE-implementation-based (e.g., specifying a value in the slTxDirectCurrentLocation or sl-TxDirect-CurrentLocation field that is above 3300 that indicates an undetermined DC location within an associated carrier). In some aspects, the signal includes an indication for UEs to transmit and/or receive DC location indications for SL communication. For example, referring to FIG. 4, the UE 404 may receive UE DC location indication signaling 408 indicating for the UE 404 to receive and/or transmit a DC location indication (e.g., DC location indication 414 or 416). For example, 802 may be performed by a DC location indication reception component 1140.

At 804 the UE may receive, from a second UE, an indication of a first DC location corresponding to a first subcarrier of multiple subcarriers. The indication may be received based on at least one of the signaling received at 802 and/or a SL communication (e.g., SL establishment or initiation) with the second UE. The DC location indication may be received via one of a UE-capability message, an RRC reconfiguration message, a MAC-CE, a PSBCH, or a MIB. The DC location indication, in some aspects, may be received based on a signal from a base station relating to a transmission of a DC location indication between UEs for SL communication.

In some aspects, the DC tone or frequency location may be dependent on the receiving and/or transmitting UE's implementation. For example, in an NR network, a base station may configure a UE for SL communications in various BWPs within various CCs. Different UEs may have different RF receiver implementations. For example, some UEs may use a single RF and/or baseband chain for all CCs and/or all BWPs, while other UEs may use different RF and/or baseband chains for different CCs and/or different BWPs. Thus, the DC tone location may vary among different UEs, as well as within the same UE depending on the RF frontend configuration in use. For example, referring to FIGS. 4-6, a UE 404, 504, or 604 may receive a DC location indication 414, 510, or 610. As illustrated in FIGS. 5 and 6, the DC location indication may be included in one or more of a UECapabilityInformationSidelink message 510A, an RRCReconfigurationCompleteSidelink message 510B, e.g., when a UE 404, 504, or 604 transmits a prior DC location indication request. In some aspects, the DC location indication may be included in one or more of an RRCReconfigurationSidelink message 610A, a MAC-CE 610B, a PSBCH 610C, or a MIB 610D. For example, 804 may be performed by a DC location indication reception component 1140.

At 806, the UE may receive, from the second UE, a request for a second DC location. The request may be received based on at least one of the signaling received at 802 and/or a SL communication (e.g., SL establishment or initiation) with the second UE. The DC location request may be included in a SCCH message. The DC location request (e.g., the SCCH message) may be one of an RRC reconfiguration message, or a UE-capability information enquiry in some aspects. The second UE may be a second UE with which the UE has begun a SL communication (e.g., a UE from which the UE has previously received a SL transmission). For example, referring to FIGS. 4 and 5, the UE 404 or 504 may receive a DC location request 412 or 508, respectively. The DC location request 412 or 508 may be included in a SCCH message (e.g., ueCapabilityEnquirySidelink message 508A or RRCReconfigurationCompleteSidelink message 508B). For example, 806 may be performed by a DC location indication reception component 1140.

At 808, the UE may detect a second DC location. The UE may detect the second DC location based on an amplitude associated with the second DC location that is above a threshold amplitude. The threshold, in some aspects, may be based on a signal strength of a SL communication (e.g., PSSCH data or PSCCH data). In some aspects, the UE may detect the DC location based on the physical characteristics of the UE. For example, referring to FIG. 4, the UE 404 may detect 410A a DC location. For example, 808 may be performed by DC location indication transmission component 1142.

At 810, the UE may transmit, to the second UE, an indication of the second DC location corresponding to a second subcarrier of the multiple subcarriers. The indication of the first DC location may be transmitted based on the request received at 804. The indication of the second DC location may be included in an RRC reconfiguration message. For example, referring to FIGS. 4-6, the UE 404 or the UE 504 may transmit the DC location indication 416 or DC location indication 510. The DC location indication 416 may include one of an RRCReconfigurationSidelink message 610A (e.g., including a txDirectCurrentLocation field or message), a medium access control (MAC) control element (MAC-CE) 610B (e.g., including a txDirectCurrentLocation field or message), a PSBCH 610C, or a MIB 610D. The DC location indication 510 may include one or more of a UECapabilityInformation-Sidelink message 510A, an RRCReconfigurationCompleteSidelink message 510B. For example, 810 may be performed by DC location indication transmission component 1142.

At 812, the UE may decode at least one transmission from the second UE based on the filtered first subcarrier corresponding to the DC location. The transmission received from the second UE via the first subcarrier corresponding to the indicated first DC location may be associated with at least one of a signal with an amplitude greater than a threshold amplitude or an amount (or measure) of noise at the first UE (e.g., a signal-to-noise ratio below a threshold). For example, referring to FIG. 4, the UE 404 may decode 420 the SL transmission 418. For example, 812 may be performed by a DC location compensation component 1144.

In some aspects, decoding, at 812, the at least one transmission from the second UE may include filtering, based on the received indication, the first subcarrier corresponding to the DC location. Decoding, at 812, the at least one transmission from the second UE may include, in some aspects, excluding the DC location (e.g., ignoring or not using) the transmission at the DC location subcarrier. In some aspects, decoding, at 812, the at least one transmission from the second UE may include compensating for the corresponding DC tone (e.g., the tone at an indicated DC location). Decoding, at 812, the at least one transmission from the second UE may include, in some aspects, puncturing a transmission at the indicated DC location.

Figure 9:
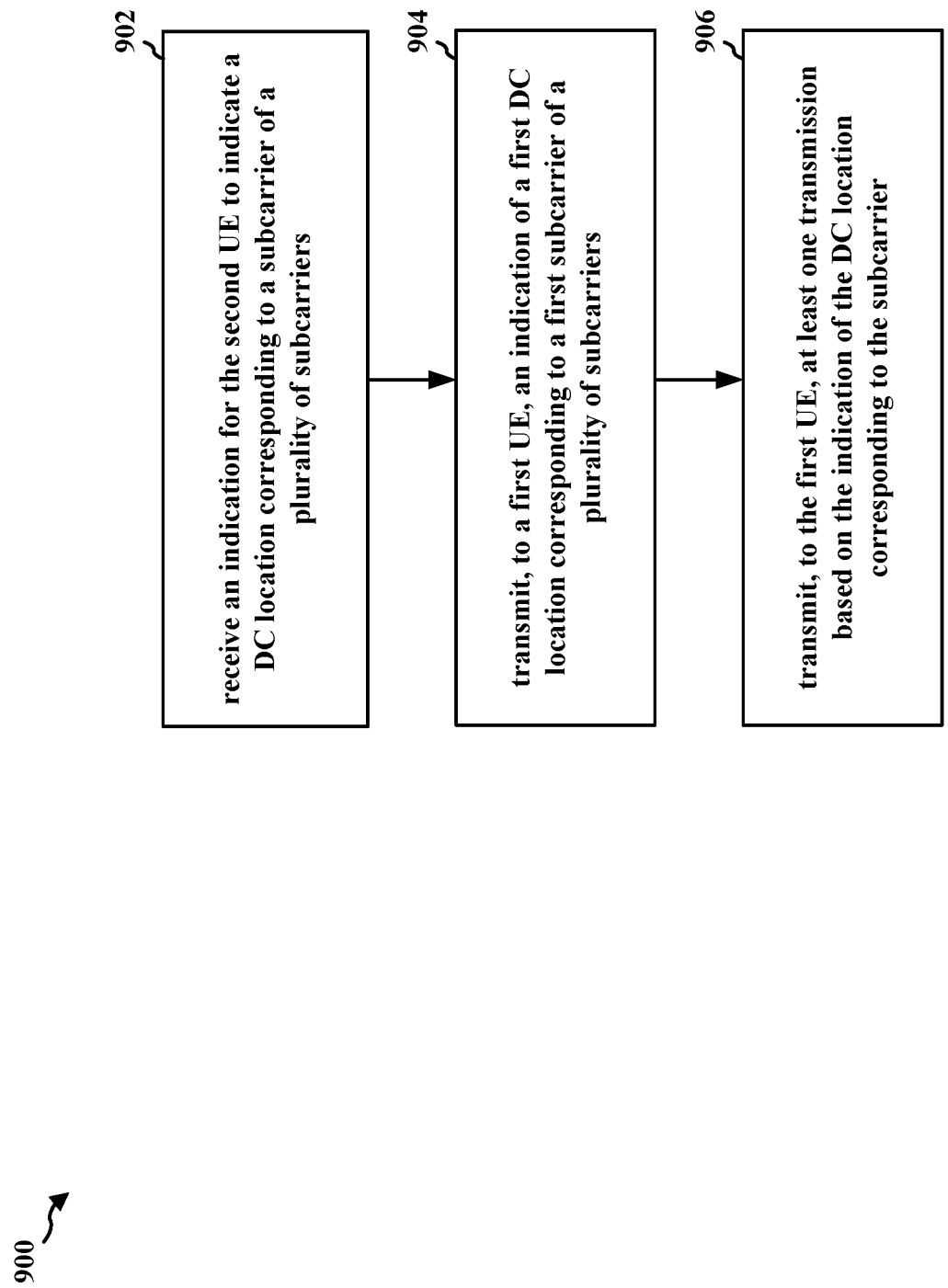
FIG. 9 is a flowchart of a method of wireless communication.

FIG. 9 is a flowchart 900 of a method of wireless communication. The method may be performed by a second UE (e.g., the UE 104 or 406; the apparatus 1102). At 902, the second UE may receive an indication for the second UE to indicate a DC location corresponding to a subcarrier of multiple subcarriers. The indication for the second UE to indicate a DC location, in some aspects, may be a request from the first UE for the first DC location that is received via a SCCH message. The DC location request may be included in a SCCH message. The DC location request (e.g., the SCCH message) may be one of an RRC reconfiguration message, or a UE-capability enquiry in some aspects. In some aspects, the indication for the second UE to indicate a DC location may be a signal from a base station relating to a transmission of a DC location between sidelink UEs. For example, referring to FIGS. 4 and 5, the UE 406 or 506 may receive a DC location request 412 or 508, respectively, or a UE DC location indication signaling 408. The DC location request 412 or 508 may be included in a SCCH message (e.g., ueCapabilityEnquirySidelink message 508A or RRCReconfigurationCompleteSidelink message 508B). For example, 902 may be performed by a DC location indication transmission component 1142.

At 904, the second UE may transmit, to a first UE, an indication of a first DC location corresponding to a first subcarrier of multiple subcarriers. The DC location indication may be transmitted in one of a UE-capability message, an RRC reconfiguration message, a MAC-CE, a PSBCH, or a MIB. The DC location indication, in some aspects, may be transmitted based on a signal from a base station relating to a transmission of a DC location indication between UEs for SL communication.

In some aspects, the DC frequency location may be dependent on the receiving and/or transmitting UE's implementation. For example, in an NR network, a base station may configure a UE for SL communications in various BWPs within various CCs. Different UEs may have different RF receiver implementations. For example, some UEs may use a single RF and/or baseband chains for all CCs and/or all BWPs, while other UEs may use different RF and/or baseband chains for different CCs and/or different BWPs. Thus, the DC tone location may vary among different UEs, as well as within the same UE depending on the RF frontend configuration in use. For example, referring to FIGS. 4-6, a UE 406, 506, or 606 may transmit a DC location indication 414, 510, or 610. The DC location indication 414, or the DC location indication 610, may include one of an RRCReconfigurationSidelink message 610A (e.g., including a txDirectCurrentLocation field or message), a medium access control (MAC) control element (MAC-CE) 610B (e.g., including a txDirectCurrentLocation field or message), a PSBCH 610C, or a MIB 610D. The DC location indication 510 may include one or more of a UECapabilityInformationSidelink message 510A, an RRCReconfigurationCompleteSidelink message 510B. For example, 904 may be performed by a DC location indication transmission component 1142.

Finally, at 906, the second UE may transmit to the first UE, at least one transmission associated with the indication of the DC location corresponding to the subcarrier. The at least one transmission may include a SL transmission associated with a PSSCH or a PSCCH. The at least one transmission may avoid encoding data or exclude data from the DC location (e.g., puncture the transmission at the DC location) indicated for the second UE and/or a DC location indicated for the first UE. For example, referring to FIGS. 4 and 6, the UE 406 or 606 may transmit SL transmission 418 or 612 respectively. For example, 906 may be performed by DC location compensation component 1144.

Figure 10:
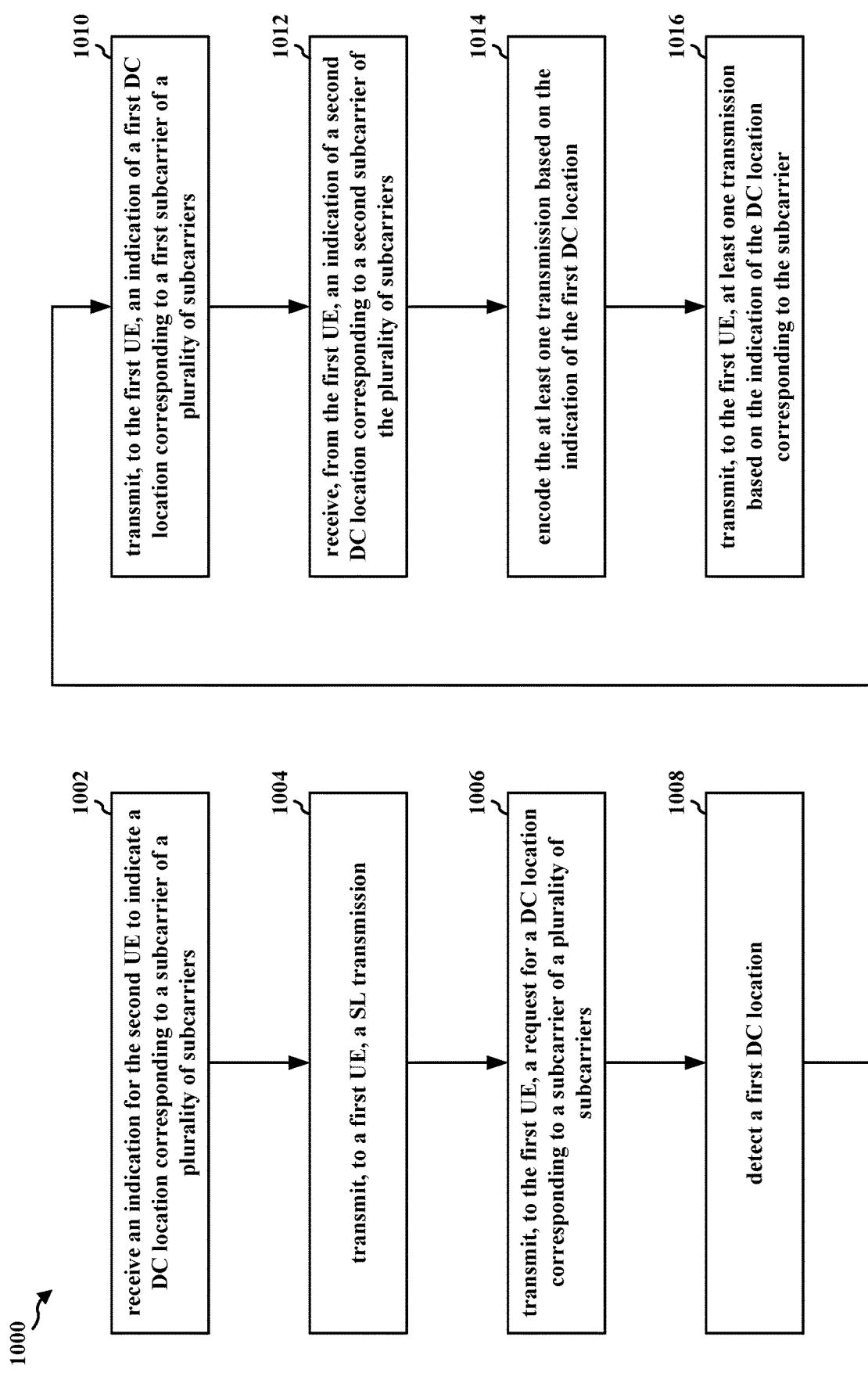
FIG. 10 is a flowchart of a method of wireless communication.

FIG. 10 is a flowchart 1000 of a method of wireless communication. The method may be performed by a second UE (e.g., the UE 104 or 406; the apparatus 1102). At 1002, the second UE may receive an indication for the second UE to indicate a DC location corresponding to a subcarrier of multiple subcarriers. The indication for the second UE to indicate a DC location, in some aspects, may be a request from the first UE for the first DC location that is received via a SCCH message. The DC location request may be included in a SCCH message. The DC location request (e.g., the SCCH message) may be one of an RRC reconfiguration message, or a UE-capability enquiry in some aspects. In some aspects, the indication for the second UE to indicate a DC location may be a signal from a base station relating to a transmission of a DC location between sidelink UEs. For example, referring to FIGS. 4 and 5, the UE 406 or 506 may receive a DC location request 412 or 508, respectively, or a UE DC location indication signaling 408. The DC location request 412 or 508 may be included in a SCCH message (e.g., ueCapabilityEnquirySidelink message 508A or RRCReconfigurationCompleteSidelink message 508B). For example, 1002 may be performed by a DC location indication transmission component 1142.

At 1004, the second UE may transmit, to a first UE, a SL transmission. The SL transmission may be an SL transmission used for establishing or configuring an SL communication between the first UE and the second UE. In some aspects, the SL transmission 608 may include a SCI transmission indicating the DC location (e.g., by indicating a bitmask associated with a MAC-CE including a DC location indication). The bitmask may, in some aspects, indicate a location of the MAC-CE including the DC location indication. The SCI directly or indirectly indicating the first DC location may be received in one of a PSSCH or a PSCCH. In some aspects, the SL transmission includes SL data (e.g., via a PSSCH) that does not account for any DC location. The DC location information, in some aspects, may not be known at the time of the SL transmission. For example, referring to FIG. 6, the UE 606 may transmit SL transmission 608. For example, 1004 may be performed by a DC location indication transmission component 1142.

At 1006, the second UE may transmit, to the first UE, a request for the first DC location. The request may be transmitted based on at least one of the signaling received at 1002 and/or a SL communication (e.g., SL establishment or initiation) with the first UE. The DC location request may be included in a SCCH message. The DC location request (e.g., the SCCH message) may be one of an RRC reconfiguration message, or a UE-capability information enquiry in some aspects. For example, referring to FIGS. 4 and 5, the UE 406 or 506 may transmit a DC location request 412 or 508, respectively. The DC location request 412 or 508 may be included in a SCCH message (e.g., ueCapabilityEnquirySidelink message 508A or RRCReconfigurationCompleteSidelink message 508B). For example, 1006 may be performed by a DC location indication reception component 1140.

At 1008, the second UE may detect a first DC location corresponding to a first subcarrier of multiple subcarriers. The second UE may detect the first DC location based on an amplitude associated with the first DC location that is above a threshold amplitude. The threshold, in some aspects, may be based on a signal strength of a SL communication (e.g., PSSCH data or PSCCH data). For example, a signal strength threshold may be established based on a signal strength of an SL communication modified by a configured signal strength factor (e.g., a multiplicative factor) or signal strength offset (an additive factor). In some aspects, the second UE may detect the DC location based on the physical characteristics of the second UE. In some aspects, the DC frequency location may be dependent on the receiving and/or transmitting UE's implementation. For example, in an NR network, a base station may configure a UE for SL communications in various BWPs within various CCs. Different UEs may have different RF receiver implementations. For example, some UEs may use a single RF and/or baseband chain for all CCs and/or all BWPs, while other UEs may use different RF and/or baseband chains for different CCs and/or different BWPs. Thus, the DC tone location may vary among different UEs, as well as within the same UE depending on the RF frontend configuration in use. For example, referring to FIG. 4, the UE 406 may detect 410B a DC location. For example, 1008 may be performed by DC location indication transmission component 1142.

At 1010 the second UE may transmit, to a first UE, an indication of the first DC location corresponding to a first subcarrier of multiple subcarriers. The indication of the first DC location may be received based on the request transmitted at 1006. The DC location indication may be transmitted in one of a UE-capability message, an RRC reconfiguration message, a MAC-CE, a PSBCH, or a MIB. In some aspects, the DC location indication may be received based on a DC location request transmitted by the first UE. The DC location indication, in some aspects, may be received based on a signal from a base station relating to a transmission of a DC location indication between UEs for SL communication. For example, referring to FIGS. 4-6, a UE 406, 506, or 606 may transmit a DC location indication 414, 510, or 610. As illustrated in FIGS. 5 and 6, the DC location indication may be included in one or more of a UECapabilityInformationSidelink message 510A, an RRCReconfigurationComplete-Sidelink message 510B, an RRCReconfigurationSidelink message 610A, a MAC-CE 610B, a PSBCH 610C, or a MIB 610D. For example, 1010 may be performed by a DC location indication transmission component 1142.

At 1012, the second UE may receive, from the first UE, an indication of a second DC location corresponding to a second subcarrier of the multiple subcarriers. The indication of the second DC location may be included in an RRC reconfiguration message. For example, referring to FIGS. 4-6, the UE 406 and/or the UE 506 may receive the DC location indication 416 and or the DC location indication 510. The DC location indication 416 may include one of an RRCReconfigurationSidelink message 610A (e.g., including a txDirectCurrentLocation field or message), a MAC-CE 610B (e.g., including a txDirectCurrentLocation field or message), a PSBCH 610C, or a MIB 610D. The DC location indication 510 may be included in one or more of a UECapabilityInformationSidelink message 510A or an RRCReconfiguration-CompleteSidelink message 510B. For example, 1012 may be performed by DC location indication reception component 1140.

At 1014, the second UE may encode the at least one transmission based on the indication of the first DC location (and/or the second DC location). In some aspects, encoding the at least one transmission incudes not encoding data on at least one indicated (e.g., first and/or second) DC location. For example, referring to FIGS. 4 and 6, the UE 406 and/or 606 may encode a transmission (e.g., SL transmission 418 and/or SL transmission 612) based on a DC location indication 414, 416, and/or 610. For example, 1014 may be performed by DC location compensation component 1144.

Finally, at 1016 the second UE may transmit, to the first UE, at least one transmission based on the indication of the DC location corresponding to the subcarrier filter. The at least one transmission may include a SL transmission associated with a PSSCH or a PSCCH. The at least one transmission may avoid or exclude data from the DC location (e.g., puncture the transmission at the DC location) indicated for the second UE and/or a DC location indicated for the first UE. For example, referring to FIGS. 4 and 6, the UE 406 or 606 may transmit SL transmission 418 or 612 respectively. The transmission from the second UE via the first subcarrier corresponding to the indicated first DC location may be associated with at least one of a signal with an amplitude greater than a threshold amplitude or an amount of noise at the first UE. In some aspects, the at least one transmission may be encoded based on the indication of the first DC location before being transmitted. For example, 1014 may be performed by DC location compensation component 1144.

Figure 11:
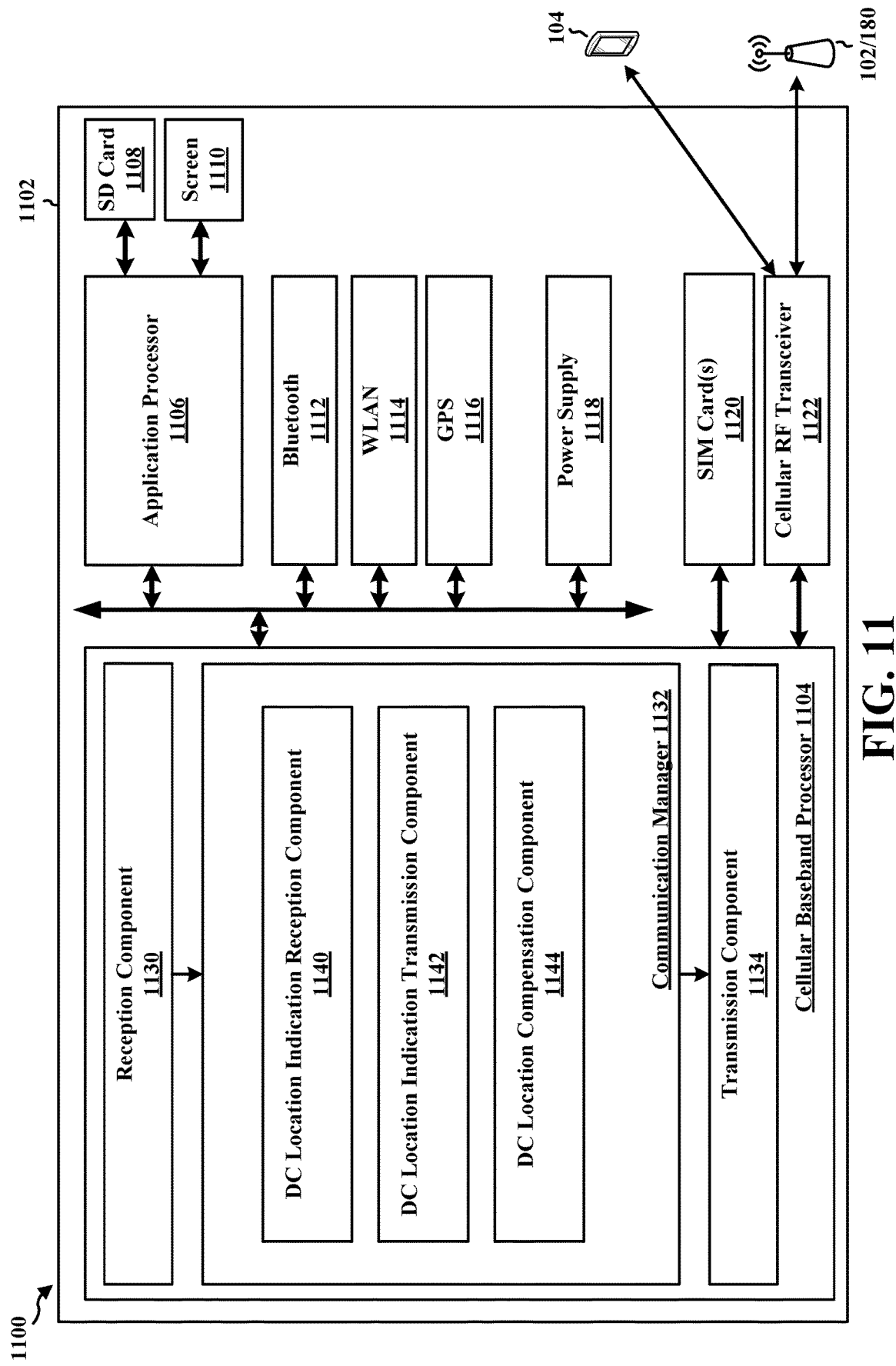
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a DC location indication reception component 1140 that is configured to receive, from a base station, signaling relating to a transmission of a DC location between SL UEs; transmit and/or receive a request for a DC location; and receive an indication of a DC location corresponding to a subcarrier of multiple subcarriers, e.g., as described in connection with 702, 802, 804, 806, 1002, 1006, and 1012 of FIGS. 7, 8, and 10. The communication manager 1132 further includes a DC location indication transmission component 1142 that receives input in the form of a DC location indication request from the DC location indication reception component 1140 and is configured to receive a request for a DC location corresponding to a subcarrier of multiple subcarriers, to receive an indication for the UE to indicate a DC location corresponding to a subcarrier of multiple subcarriers, detect a DC location, and transmit an indication of a DC location corresponding to a subcarrier of the multiple subcarriers, e.g., as described in connection with 808, 810, 902, 904, 1008, and 1010. The communication manager 1132 further includes a DC location compensation component 1144 that receives input in the form of an SL transmission from another device and is configured to decode at least one transmission from the second UE based on the indicated first subcarrier corresponding to the DC location, encode at least one transmission based on the indication of at least one DC location, where the at least one transmission is encoded before being transmitted. and transmit at least one transmission based on the indication of the DC location corresponding to the subcarrier, e.g., as described in connection with 704, 706, 812, 906, 1014, and 1016.

The apparatus may include additional components that perform each of the blocks of the algorithm in the flowcharts of FIGS. 7-10. As such, each block in the flowcharts of FIGS. 7-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a second UE, an indication of a first DC location corresponding to a first subcarrier of multiple subcarriers. The apparatus 1102, and in particular the cellular baseband processor 1104, may further include means for decoding the at least one transmission from the second UE based on the filtered first subcarrier corresponding to the DC location. The apparatus 1102, and in particular the cellular baseband processor 1104, may further include means for transmitting, to the second UE, an indication of a second DC location corresponding to a second subcarrier of the multiple subcarriers. The apparatus 1102, and in particular the cellular baseband processor 1104, may further include means for receiving, from the second UE, a request for a second DC location, where the indication of the second DC location is transmitted based on the received request. The apparatus 1102, and in particular the cellular baseband processor 1104, may further include means for detecting the second DC location based on an amplitude associated with the second DC location that is above a threshold amplitude. The apparatus 1102, and in particular the cellular baseband processor 1104, may further include means for receiving, from a base station, signaling relating to a transmission of a DC location between SL UEs. The apparatus 1102, and in particular the cellular baseband processor 1104, may further include means for receiving, from the second UE, at least one SCI transmission indicating the DC location (e.g., indicating a bitmask associated with a MAC-CE), the SCI being received in one of a PSSCH or a PSCCH. The apparatus 1102, and in particular the cellular baseband processor 1104, may further include means for receiving an indication for the second UE to indicate a direct current (DC) location corresponding to a subcarrier of multiple subcarriers. The apparatus 1102, and in particular the cellular baseband processor 1104, may further include means for transmitting, to a first UE, an indication of a first DC location corresponding to a first subcarrier of multiple subcarriers. The apparatus 1102, and in particular the cellular baseband processor 1104, may further include means for transmitting, to the first UE, at least one transmission based on the indication of the DC location corresponding to the subcarrier. The apparatus 1102, and in particular the cellular baseband processor 1104, may further include means for transmitting, to the first UE, at least one SCI transmission indicating the DC location (e.g., indicating a bitmask associated with a MAC-CE), the SCI being transmitted in one of a PSSCH or a PSCCH. The apparatus 1102, and in particular the cellular baseband processor 1104, may further include means for transmitting, to the first UE, at least one transmission before the MAC-CE is transmitted, the at least one transmission being transmitted via a PSBCH. The apparatus 1102, and in particular the cellular baseband processor 1104, may further include means for receiving, from the first UE, an indication of a second DC location corresponding to a second subcarrier of the multiple subcarriers. The apparatus 1102, and in particular the cellular baseband processor 1104, may further include means for detecting the first DC location based on an amplitude associated with the first DC location that is above a threshold amplitude. The apparatus 1102, and in particular the cellular baseband processor 1104, may further include means for encoding the at least one transmission based on the indication of the first DC location, where the at least one transmission is encoded before being transmitted. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

In some aspects of wireless communication, e.g., 5G NR, a DC location may be indicated by a base station to a set of UEs. The DC location indication may indicate that the DC location associated with the UE is determined by a UE (e.g., is based on the UE implementation or is otherwise UE-dependent). The DC location (e.g., subcarrier) may contribute to interference and/or noise and may cause performance degradation. A receiver (e.g., a receiving UE) may apply DC rejection filtering or puncturing to mitigate the degradation (e.g., may disregard the tone affected by DC) based on a received DC location indication. It may thus be beneficial for a transmitting UE communicating with a receiving UE via SL to indicate a DC location (e.g., subcarrier) associated with the UE when the base station indicates that the DC location is UE-dependent. In some aspects, a transmitter (e.g., a transmitting UE) may apply DC puncturing (e.g., avoiding transmitting data via a DC location associated with either the receiving or transmitting UE) to mitigate the degradation based on a detected and/or received DC location indication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a second UE, an indication of a first DC location corresponding to a first subcarrier of multiple subcarriers; and decode at least one transmission from the second UE based on the received indication of the first DC location corresponding to the first subcarrier.

Aspect 2 is the apparatus of aspect 1, where the at least one processor is configured to decode the at least one transmission based on the received indication of the first DC location by at least one of (1) filtering the first subcarrier, (2) puncturing the first subcarrier, (3) compensating for a DC tone at the first subcarrier, or (4) not using data from the first subcarrier.

Aspect 3 is the apparatus of any of aspects 1 and 2, the at least one processor further configured to transmit, to the second UE, an indication of a second DC location corresponding to a second subcarrier of the multiple subcarriers.

Aspect 4 is the apparatus of aspect 3, the at least one processor further configured to receiving, from the second UE, a request for a second DC location, where the indication of the second DC location is transmitted based on the received request.

Aspect 5 is the apparatus of aspect 4, where the request for the second DC location is received via a SCCH message that is at least one of an RRC reconfiguration message or a UE-capability information enquiry.

Aspect 6 is the apparatus of any of aspects 3 to 5, where the indication of the second DC location is transmitted via a SCCH message that is at least one of an RRC reconfiguration message or a UE-capability information message.

Aspect 7 is the apparatus of any of aspects 3 to 6, the at least one processor is further configured to detect the second DC location based on an amplitude associated with the second DC location that is above a threshold amplitude.

Aspect 8 is the apparatus of any of aspects 1 to 7, the at least one processor is further configured to receive, from a base station, signaling relating to at least one of enabling or disabling a transmission of a DC location between sidelink UEs.

Aspect 9 is the apparatus of any of aspects 1 to 8, where the indication of the first DC location is received via at least one of (1) an RRC reconfiguration message, (2) a MAC-CE, (3) a payload of a PSBCH or (4) a payload of a MIB.

Aspect 10 is the apparatus of aspect 9, where the MAC-CE is received via a PSSCH.

Aspect 11 is the apparatus of any of aspects 9 or 10, where the first DC location is received via a payload of a SCI transmission associated with one of a PSSCH or a PSCCH.

Aspect 12 is the apparatus of any of aspects 1 to 11, where a transmission received from the second UE via the first subcarrier corresponding to the indicated first DC location is associated with at least one of a signal with an amplitude greater than a threshold amplitude or an amount of noise at the first UE greater than a threshold amount of noise.

Aspect 13 is the apparatus of any of aspects 1 to 12, further including at least one transceiver coupled to the at least one processor.

Aspect 14 is an apparatus for wireless communication including at least one processor coupled to a memory and configured to receive an indication for the second UE to indicate a DC location corresponding to a subcarrier of multiple subcarriers; transmit, to a first UE, an indication of a first DC location corresponding to a first subcarrier of multiple subcarriers; and transmit, to the first UE, at least one transmission associated with the indication of the first DC location corresponding to the first subcarrier.

Aspect 15 is the apparatus of aspect 14, where the indication for the second UE to indicate the DC location includes a request from the first UE for the first DC location received via a SCCH message.

Aspect 16 is the apparatus of aspect 15, where the SCCH message is at least one of an RRC reconfiguration message or a UE-capability information enquiry.

Aspect 17 is the apparatus of any of aspects 14 to 16, where the indication of the first DC location is transmitted in a UE-capability information message.

Aspect 18 is the apparatus of any of aspects 14 to 17, where the indication for the second UE to indicate the DC location includes a signal from a base station relating to at least one of enabling or disabling a transmission of a DC location between sidelink UEs.

Aspect 19 is the apparatus of any of aspects 14 to 18, where the indication of the first DC location is transmitted via at least one of (1) an RRC reconfiguration message, (2) a MAC-CE, (3) a payload of a PSBCH or (4) a payload of a MIB.

Aspect 20 is the apparatus of aspect 19, where the indication of the first DC location is transmitted via a MAC-CE transmitted via a PSSCH.

Aspect 21 is the apparatus of claim 20, where the first DC location is transmitted via a payload of a SCI associated with one of a PSSCH or a PSCCH.

Aspect 22 is the apparatus of aspects 20 or 21, the at least one processor further configured to transmit, to the first UE, at least one transmission before the MAC-CE is transmitted, the at least one transmission being transmitted via a PSBCH.

Aspect 23 is the apparatus of any of aspects 14 to 22, the at least one processor further configured to receive receiving, from the first UE, an indication of a second DC location corresponding to a second subcarrier of the multiple subcarriers.

Aspect 24 is the apparatus of aspect 23, where the indication of the second DC location is received in an RRC reconfiguration message.

Aspect 25 is the apparatus of any of aspects 14 to 24, the at least one processor further configured to detect the first DC location based on an amplitude associated with the first DC location that is above a threshold amplitude.

Aspect 26 is the apparatus of any of aspects 14 to 25, where the at least one transmission via the first subcarrier corresponding to the indicated first DC location is associated with at least one of a signal with an amplitude greater than a threshold amplitude or an amount of noise at the first UE.

Aspect 27 is the apparatus of any of aspects 14 to 26, the at least one processor further configured to encode the at least one transmission based on the indication of the first DC location, where the at least one transmission is encoded before being transmitted.

Aspect 28 is the apparatus of any of aspects 14 to 27, further including at least one transceiver coupled to the at least one processor.

Aspect 29 is a method of wireless communication for implementing any of aspects 1 to 28.

Aspect 30 is an apparatus for wireless communication including means for implementing any of aspects 1 to 28.

Aspect 31 is a computer-readable medium storing computer executable code, where the code when executed by a processor causes the processor to implement any of aspects 1 to 28.

What is claimed is:

1. An apparatus for wireless communication at a first user equipment (UE) comprising:
   memory; and
   one or more processors coupled to the memory, wherein the one or more processors are configured to:
      receive, from a base station, signaling indicating for the first UE to receive a direct current (DC) location indication for a sidelink (SL) communication;
      transmit, to a second UE and based on the signaling, a request for a location of a first DC location associated with the SL communication;
      receive, from Hall the second UE, an indication of Hall the first DC location associated with the SL communication corresponding to a first subcarrier of a plurality of subcarriers; and
      decode at least one SL transmission from the second UE based on the indication of the first DC location corresponding to the first subcarrier by compensating for a DC tone at the first subcarrier.

2. The apparatus of claim 1, wherein to decode the at least one SL transmission based on the indication of the first DC location, the one or more processors are configured to filter the first subcarrier.

3. The apparatus of claim 1, wherein the one or more processors are further configured to transmit, to the second UE, an additional indication of a second DC location associated with the SL communication corresponding to a second subcarrier of the plurality of sub carriers.

4. The apparatus of claim 3, wherein the one or more processors are further configured to receive, from the second UE, a request for the second DC location, wherein to transmit the indication of the second DC location, the one or more processors are configured to transmit the indication of the second DC location based on the request.

5. The apparatus of claim 4, wherein to receive the request for the second DC location, the one or more processors are configured to receive the request for the second DC location via a sidelink control channel (SCCH) message that is at least one of a radio resource control (RRC) reconfiguration message associated with the SL communication or a UE-capability information enquiry associated with the SL communication.

6. The apparatus of claim 3, wherein to transmit the indication of the second DC location, the one or more processors are configured to transmit the indication of the second DC location via a sidelink control channel (SCCH) message that is at least one of a radio resource control (RRC) reconfiguration message associated with the SL communication or a UE-capability information message associated with the SL communication.

7. The apparatus of claim 3, wherein the one or more processors are further configured to detect the second DC location based on an amplitude associated with the second DC location that is above a threshold amplitude.

8. The apparatus of claim 1, wherein to receive the indication of the first DC location, the one or more processors are configured to receive the indication of the first DC location via at least one of (1) a radio resource control (RRC) SL reconfiguration message, (2) a medium access control (MAC) control element (MAC-CE), (3) a first payload of a physical sidelink broadcast channel (PSBCH) or (4) a second payload of a master information block (MIB).

9. The apparatus of claim 8, wherein to receive the MAC-CE, the one or more processors are configured to receive the MAC-CE via a physical sidelink shared channel (PSSCH).

10. The apparatus of claim 8, wherein to receive the first DC location, the one or more processors are configured to receive the first DC location via a third payload of a sidelink control information (SCI) transmission associated with one of a physical sidelink shared channel (PSSCH) or a physical sidelink control channel (PSCCH).

11. The apparatus of claim 1, wherein a transmission received from the second UE via the first subcarrier corresponding to the first DC location is associated with at least one of a signal with an amplitude greater than a threshold amplitude or an amount of noise at the first UE greater than a threshold amount of noise.

12. The apparatus of claim 1, further comprising a transceiver coupled to the one or more processors.

13. An apparatus for wireless communication at a second user equipment (UE) comprising:
   memory; and
   one or more processors coupled to the memory, wherein the one or more processors are configured to:
      receive, from a base station, signaling indicating for the second UE to transmit a direct current (DC) location indication for a sidelink (SL) a first direct current (DC) location associated with a SL communication corresponding to a first subcarrier of a first plurality of subcarriers;
      receive, from a first UE and based on the signaling, a request for a location of a first DC location associated with the SL communication;

transmit, to the first UE, an indication of the first DC location associated with the SL communication corresponding to the first subcarrier of the first plurality of subcarriers; and transmit, to the first UE, at least one SL transmission associated with the indication of the first DC location corresponding to the first subcarrier.

14. The apparatus of claim 13, wherein to receive the request from the first UE, the one or more processors are configured to receive the request via a sidelink control channel (SCCH) message.

15. The apparatus of claim 14, wherein the SCCH message is at least one of a radio resource control (RRC) reconfiguration message associated with the SL communication or a UE-capability information enquiry associated with the SL communication.

16. The apparatus of claim 13, wherein to transmit the indication of the first DC location, the one or more processors are configured to transmit the indication of the first DC location in a UE-capability information message associated with the SL communication.

17. The apparatus of claim 13, wherein to transmit the second indication of the first DC location, the one or more processors are configured to transmit the indication of the first DC location via at least one of (1) a radio resource control (RRC) reconfiguration message associated with the SL communication, (2) a medium access control (MAC) control element (MAC-CE), (3) a first payload of one of a physical sidelink broadcast channel (PSBCH) or (4) a second payload of a master information block (MIB).

18. The apparatus of claim 17, wherein to transmit the MAC-CE, the one or more processors are configured to transmit the MAC-CE via a physical sidelink shared channel (PSSCH).

19. The apparatus of claim 17, wherein to transmit the first DC location, the one or more processors are configured to transmit the first DC location via a third payload of a sidelink control information (SCI) transmission associated with one of a physical sidelink shared channel (PSSCH) or a physical sidelink control channel (PSCCH).

20. The apparatus of claim 13, wherein the one or more processors are further configured to receive, from the first UE, a second indication of a second DC location associated with the SL communication corresponding to a second subcarrier of the first plurality of subcarriers.

21. The apparatus of claim 20, wherein to receive the second indication the one or more processors are configured to receive the second indication of the second DC location in a radio resource control (RRC) reconfiguration message associated with the SL communication.

22. The apparatus of claim 13, wherein the one or more processors are further configured to detect the first DC location based on an amplitude associated with the first DC location that is above a threshold amplitude.

23. The apparatus of claim 13, wherein the at least one SL transmission via the first subcarrier corresponding to the first DC location is associated with at least one of a signal with an amplitude greater than a threshold amplitude or an amount of noise at the first UE.

24. The apparatus of claim 13, wherein the one or more processors are further configured to encode the at least one SL transmission based on the second indication of the first DC location, wherein the encoding of the at least one SL transmission is before the transmission of the at least one SL transmission.

25. The apparatus of claim 13, further comprising a transceiver coupled to the one or more processors.

26. A method for wireless communication at a first user equipment (UE), comprising:
receiving, from a base station, signaling indicating for the first UE to receive a direct current (DC) location indication for a sidelink (SL) communication;
transmitting, to a second UE and based on the signaling, a request for a location of a first DC location associated with the SL communication;
receiving, from the second UE, an indication of the first direct current (DC) location associated with the SL communication corresponding to a first subcarrier of a plurality of subcarriers; and
decoding at least one SL transmission from the second UE based on the indication of the first DC location corresponding to the first subcarrier by compensating for a DC tone at the first subcarrier.

27. A method for wireless communication at a second user equipment (UE), comprising:
receiving, from a base station, signaling indicating for the second UE to transmit a direct current (DC) location indication for a sidelink (SL) communication corresponding to a first subcarrier of a first plurality of subcarriers;
receiving, from a first UE and based on the signaling, a request for a location of a first DC location associated with the SL communication;
transmitting, to the first UE, an indication of the first DC location associated with the SL communication corresponding to the first subcarrier of the first plurality of subcarriers; and
transmitting, to the first UE, at least one SL transmission associated with the indication of the first DC location corresponding to the first subcarrier.

* * * * *